(12) United States Patent
Suzuki

(10) Patent No.: US 7,116,379 B2
(45) Date of Patent: Oct. 3, 2006

(54) PROJECTOR AND METHOD OF ADJUSTING PROJECTION SIZE

(75) Inventor: Masayuki Suzuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 604 days.

(21) Appl. No.: 10/220,358

(22) PCT Filed: Dec. 25, 2001

(86) PCT No.: PCT/JP01/11406

§ 371 (c)(1),
(2), (4) Date: Aug. 29, 2002

(87) PCT Pub. No.: WO02/052844

PCT Pub. Date: Jul. 4, 2002

(65) Prior Publication Data
US 2003/0020885 A1   Jan. 30, 2003

(30) Foreign Application Priority Data
Dec. 26, 2000   (JP) .............................. 2000-394730

(51) Int. Cl.
H04N 3/227   (2006.01)
H04N 3/223   (2006.01)

(52) U.S. Cl. .................... 348/747; 348/744; 348/581

(58) Field of Classification Search ................ 348/581, 348/593, 594, 595, 596, 744, 747; H04N 3/223, H04N 3/227
See application file for complete search history.

(56) References Cited

U.S. PATENT DOCUMENTS 4,392,156 A * 7/1983 Duca et al. ................. 348/597
5,172,103 A * 12/1992 Kita ............................ 345/667
5,285,268 A   2/1994 Nakagaki et al.
5,347,318 A   9/1994 Kobayashi et al.
5,721,565 A * 2/1998 Nguyen ....................... 345/660

FOREIGN PATENT DOCUMENTS

| JP | A 62-84665 | 4/1987 |
| JP | A 4-175742 | 6/1992 |
| JP | A 4-365280 | 12/1992 |
| JP | A 5-323451 | 12/1993 |
| JP | A 6-334947 | 12/1994 |
| JP | A 7-325214 | 12/1995 |
| JP | A 11-84530 | 3/1999 |
| JP | A 11-88806 | 3/1999 |
| JP | A 11-95324 | 4/1999 |
| JP | A 2000-20713 | 1/2000 |

* cited by examiner

Primary Examiner—Michael H. Lee
(74) Attorney, Agent, or Firm—Oliff & Berridge, PLC

(57) ABSTRACT

The technique of the present invention adjustably sets an image area on a center of an image display area of an image display device for displaying an image expressed by an input image signal and a mask display area surrounding the image area for displaying a black image, based on a user's setting of a parameter representing a projection size. The technique contracts or expands the image expressed by the input image signal to make a size of the image expressed by the input image signal fit a size of the image area in the process of generating a display image signal from the input image signal, while generating the display image signal to make the black image displayed in the mask display area. The projection size is thus adjustable according to the size of the image area and the size of the mask display area, which are set based on the parameter representing the projection size. This arrangement ensures simple adjustment of the projection size of the image by the projector.

4 Claims, 6 Drawing Sheets

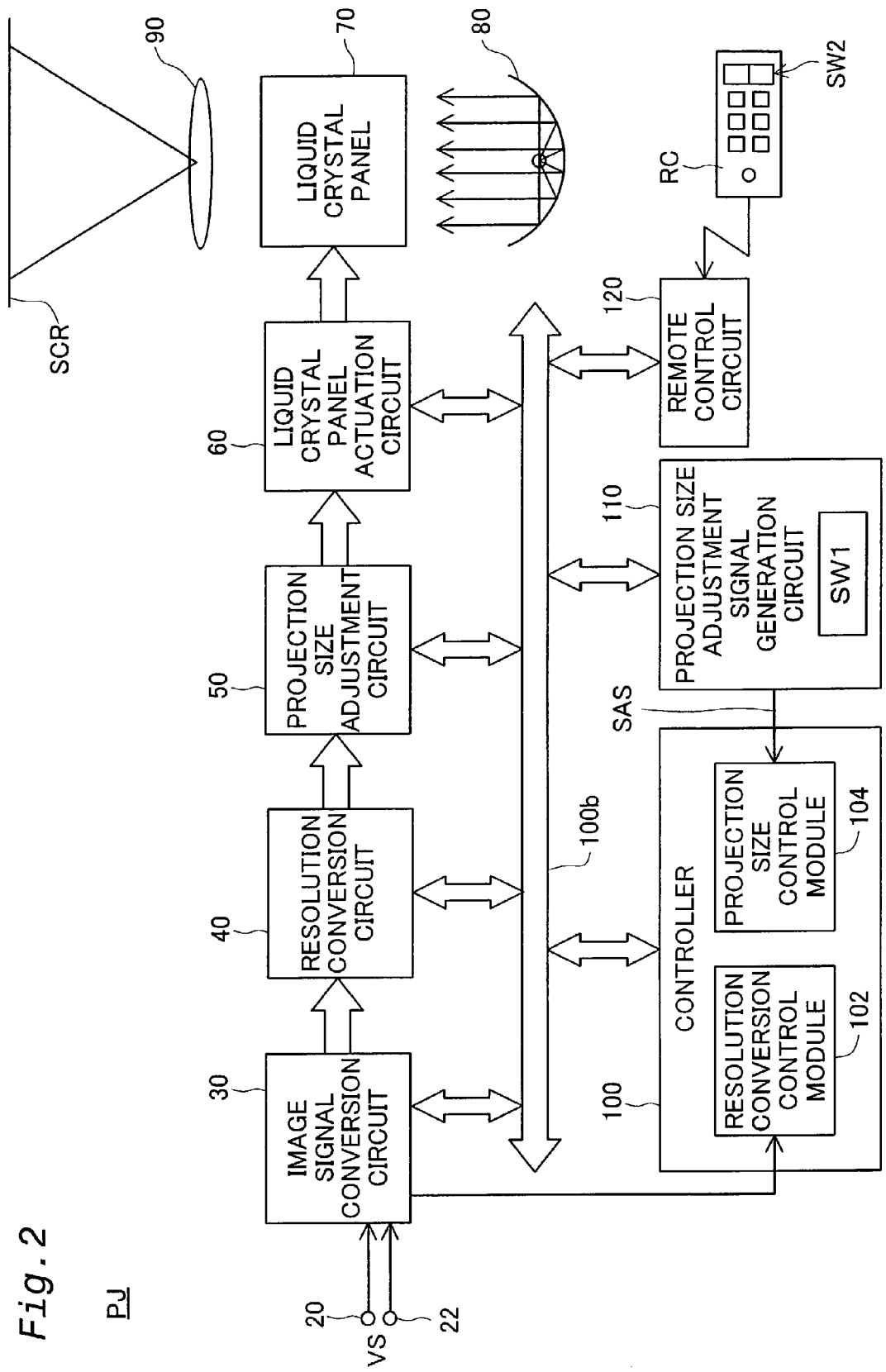

PROJECTOR AND METHOD OF ADJUSTING PROJECTION SIZE

TECHNICAL FIELD

The present invention relates to a technique of electronically adjusting the projection size of an image in a projector that projects images.

BACKGROUND ART

A projector for projecting images displays each image expressed by an input image signal in an expanded manner on a screen and is thus often used at presentations. The projector is generally constructed to project an image created by an image display device, such as a liquid crystal panel, on the screen via a projection lens.

In a conventional projector, a projection lens typically has a fixed zoom ratio, and a projection size on the screen is practically non-adjustable. One prior art technique adopted for adjustment of the projection size shifts the position of the projector and regulates the interval between the projector and the screen.

Another prior art technique uses a projection lens having the function of regulating a zoom ratio to optically adjust the projection size. The projection lens is, however, bulky and raises the total manufacturing cost.

DISCLOSURE OF THE INVENTION

The object of the present invention is thus to solve the problems of the prior art techniques and to provide a technique of readily adjusting a projection size of an image by a projector.

In order to attain at least part of the above and the other related objects, the present invention is directed to a projector that is capable of electronically adjusting a projection size of an image. The projector includes: an image display device that creates an image in response to a display image signal supplied thereto; an image signal processing module that generates the display image signal, which is to be supplied to the image display device, from an input image signal supplied from an image supply device; and a projection module that projects the image created by the image display device. The image processing module adjustably sets an image area on a center of an image display area of the image display device for displaying an image expressed by the input image signal and a mask display area surrounding the image area for displaying an image of a specific color, based on a user's setting of a parameter representing a projection size. The image processing module contracts or expands the image expressed by the input image signal to make a size of the image expressed by the input image signal fit a size of the image area in the process of generating the display image signal from the input image signal, while generating the display image signal to make the image of the specific color displayed in the mask display area.

The projector of the present invention is capable of adjusting the projection size according to the size of the image area and the size of the mask display area, which are set based on the parameter representing the projection size. This arrangement ensures simple adjustment of the projection size of the image by the projector.

In accordance with one preferable application, when the size of the image expressed by the input image signal is different from a size of the image display area, the image processing module expands or contracts the image expressed by the input image signal to make the size of the image expressed by the input image signal fit the size of the image display area to generate a resolution converted image signal. The image processing module subsequently contracts an image expressed by the resolution converted image signal to make a size of the image expressed by the resolution converted image signal fit the size of the image area.

This application attains practically the same projection size under the condition of an identical setting of the parameter representing the projection size, even when the size of the image expressed by the input image signal is varied. Namely the projection size is adjustable, irrespective of the size of the image expressed by the input image signal.

In accordance with another preferable application, in the case where the size of the image area set based on the parameter is greater than a size of the image display area, the image processing module generates the display image signal to cause an image part, which corresponds to the size of the image display area in an expanded image according to the size of the image area, to be displayed in the image display area.

This arrangement allows not only contraction but expansion of the projection size.

The present invention is also directed to a method of electronically adjusting a projection size of an image by a projector. The method includes the steps of: adjustably setting an image area on a center of an image display area of an image display device included in the projector for displaying an image expressed by an input image signal and a mask display area surrounding the image area for displaying an image of a specific color, based on a user's setting of a parameter representing a projection size; and contracting or expanding the image expressed by the input image signal to make a size of the image expressed by the input image signal fit a size of the image area in the process of generating a display image signal from the input image signal, while generating the display image signal to make the image of the specific color displayed in the mask display area.

Like the projector discussed above, the method of the present invention ensures simple adjustment of the projection size of the image by the projector.

The technique of the present invention may be actualized by a diversity of applications, for example, a projector, a method of controlling a projector, an apparatus for adjusting a projection size, and a method of adjusting the projection size.

BRIEF DESCRIPTION OF THE DRAWINGS

FIG. 2 is a block diagram illustrating the general construction of a projector PJ;

BEST MODES OF CARRYING OUT THE INVENTION

Figure 1:
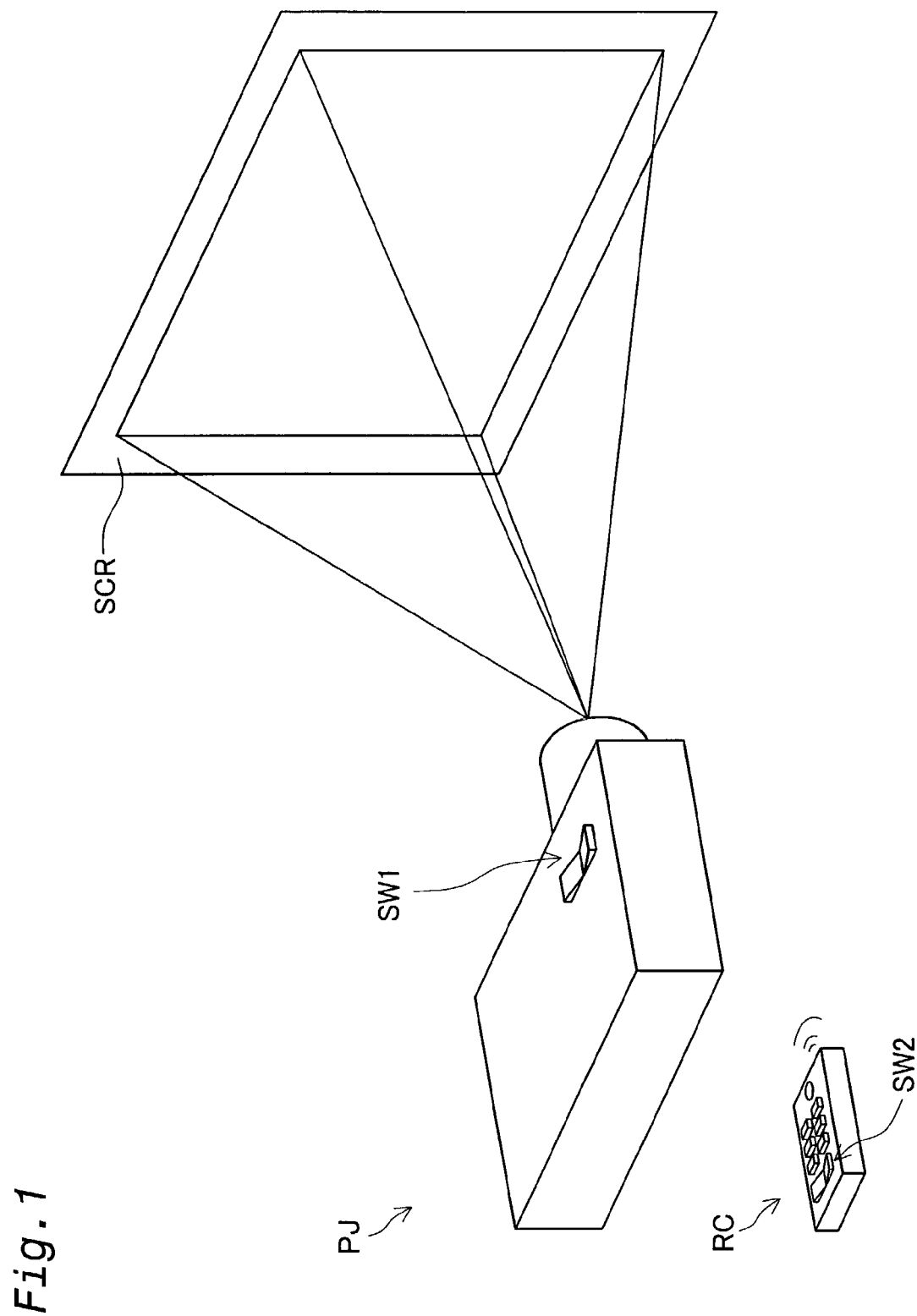
FIG. 1 shows a projection display system using a projector of the present invention.

One mode of carrying out the invention is discussed below as a preferred embodiment in the following sequence:
A. General Construction of Apparatus
B. Conversion of Resolution
C. Adjustment of Projection Size
D. Modifications A. General Construction of Apparatus FIG. 1 shows a projection display system using a projector of the present invention. A projector PJ of the present invention projects an image expressed by an image signal, which is transmitted from a non-illustrated image supply device, on a screen SCR. The projector PJ is provided with an upper switch SW1 for adjusting the projection size. A diversity of switches, for example, a seesaw switch and a control switch with '+', '−' buttons, is applicable for the switch SW1. The seesaw switch is used in this embodiment. The user presses the switch SW1 to an expansion (wide) position or to a contraction (telescopic) position to adjust the projection size of an image, which is projected on the screen SCR. The user may otherwise operate a switch SW2 provided on a remote control RC attached to the projector PJ for adjustment of the projection size of an image. The same switch is applicable for the switch SW2 as well as the switch SW1.

FIG. 2 is a block diagram illustrating the general construction of the projector PJ. The projector PJ includes image input terminals 20 and 22, an image signal conversion circuit 30, a resolution conversion circuit 40, a projection size adjustment circuit 50, a liquid crystal panel actuation circuit 60, a liquid crystal panel 70, a lighting unit 80, a projection optical system 90, a controller 100, a projection size adjustment signal generation circuit 110, and a remote control circuit 120. The controller 100 is a microcomputer including a CPU and a memory (not shown) and controls the operations of the respective blocks 30 through 90, 110, and 120 via a bus 100b. The controller 100 executes programs stored in the non-illustrated memory to function as a resolution conversion control module 102 and a projection size control module 104 discussed later.

The analog image input terminal 20 can receive a plurality of different analog image signals. Typical examples of such analog image signals include RGB signals output from a personal computer and composite image signals output from a video cassette recorder.

The image signal conversion circuit 30 attains a diversity of functions, for example, function of analog-to-digital conversion, decoding function, function of synchronizing signal separation, and image processing function. The image signal conversion circuit 30 converts an analog image signal input into the analog image input terminal 20 to digital image data, and writes the converted digital image data into a frame memory (not shown) in the image signal conversion circuit 30 or reads the previously written digital image data from the frame memory synchronously with the synchronizing signal. Diverse series of image processing are carried out in the writing or reading process.

The image signal conversion circuit 30 can also process digital image data input into the digital image input terminal 22. In such cases, a synchronizing signal is supplied independently of the digital image data, so that neither analog-digital conversion nor synchronizing signal separation is required.

The image signal conversion circuit 30 includes a non-illustrated selection circuit, which selects one of the multiple image signals input into the image input terminals 20 and 22. Selection of the image signal is based on the user's specification of a desired image with the remote control RC or a panel switch (not shown) provided on the projector.

The resolution conversion circuit 40 converts the resolution (number of pixels) of an image expressed by the input image signal into a resolution (number of pixels) acceptable by the liquid crystal panel 60. The projection size adjustment circuit 50 changes the resolution of the image expressed by the image data supplied from the resolution conversion circuit 40 to adjust the projection size. The series of processing executed by the resolution conversion circuit 40 and the projection size adjustment circuit 50 will be discussed in detail later.

The resolution conversion control module 102 controls the operations of the resolution conversion circuit 40. The projection size control module 104 controls the operations of the projection size adjustment circuit 50, based on a size adjustment signal supplied from the projection size adjustment signal generation circuit 110.

In response to the user's press of the switch SW1 for adjustment of the projection size, the projection size adjustment signal generation circuit 110 generates a size adjustment signal SAS and supplies the size adjustment signal SAS to the projection size control module 104. In response to the user's press of the switch SW2 on the remote control RC for adjustment of the projection size, the projection size adjustment signal generation circuit 110 is also actuated via the remote control circuit 120 to generate the size adjustment signal SAS.

The image signal input into either of the image input terminals 20 and 22 is subjected to diverse series of image processing in the image signal conversion circuit 30, the resolution conversion circuit 40, and the projection size adjustment circuit 50 and is given to the liquid crystal panel actuation circuit 60. The liquid crystal panel actuation circuit 60 generates a driving signal for actuating the liquid crystal panel 70 according to the given image data. The liquid crystal panel 70 functions as a light valve (light modulator) that modulates illumination light emitted from the lighting unit 80 in response to the driving signal output from the liquid crystal panel actuation circuit 60 and thereby generates an image. The intensity of the illumination light emitted from the lighting unit 80 is regulated by the controller 100.

The illumination light modulated by the liquid crystal panel 70 is output as light representing image (image light) toward the screen SCR by means of the projection optical system 90. A resulting projected image is then formed on the screen SCR. The projection magnification of the projection optical system 90 is regulated by the controller 100.

The liquid crystal panel actuation circuit 60 and the liquid crystal panel 70 correspond to the image display device of he present invention. The image signal conversion circuit 30, the resolution conversion circuit 40, the projection size adjustment circuit 50, and the controller 100 correspond to the image signal processing module of the present invention. The liquid crystal panel actuation circuit 60 may not be part of the image display device but may be included in the image signal processing module.

Although not being specifically illustrated, the liquid crystal panel 70 includes three liquid crystal panels corresponding to three colors R, G, and B. The image signal conversion circuit 30, the resolution conversion circuit 40, the projection size adjustment circuit 50, and the liquid crystal panel actuation circuit 60 respectively have the function of processing image signals of the three colors R, G, and B. The lighting unit 80 has a color light separation optical system to divide the light emitted from a light source into three color rays. The projection optical system 90 has a composition optical system and a projection lens that combines three color image rays into image light representing a color image. Any of the diverse known structures is applicable for the optical system of the projector.

The user may use the remote control RC for various inputs. The signals output from the remote control RC are given to the controller 100 and the projection size adjustment signal generation circuit 110 via the remote control circuit 120 and are subjected to a diversity of processes.

B. Conversion of Resolution

FIG. 3 shows conversion of the resolution carried out by the resolution conversion circuit 40. The resolution of an image expressed by an input image signal depends upon the type of the image supply device. For example, the number of pixels in the image expressed by the image signal supplied from the computer is 640×480 pixels in VGA, 800×600 pixels in SVGA, 1024×768 pixels in XGA, and 1280×1024 pixels in SXGA. The video signals supplied from video recorders and those from DVD (digital video disk) players also have different resolutions. Standard television signals and high resolution digital television signals have different resolutions. The liquid crystal panel 70 functioning as the image display device for the projector has, on the other hand, a fixed number of pixels. In the case where the number of pixels in an image of interest expressed by an input image signal is different from the fixed number of pixels in the liquid crystal panel 70, the image of interest can not be displayed directly. When the number of pixels in an image of interest expressed by an input image signal is different from the number of pixels in the display area of the liquid crystal panel 70, the resolution conversion circuit 40 thus expands or contracts the image of interest expressed by the input image signal to generate an image signal representing an expanded or contracted image having a specific number of pixels corresponding to the display area of the liquid crystal panel 70.

Figures 3A, 3B:
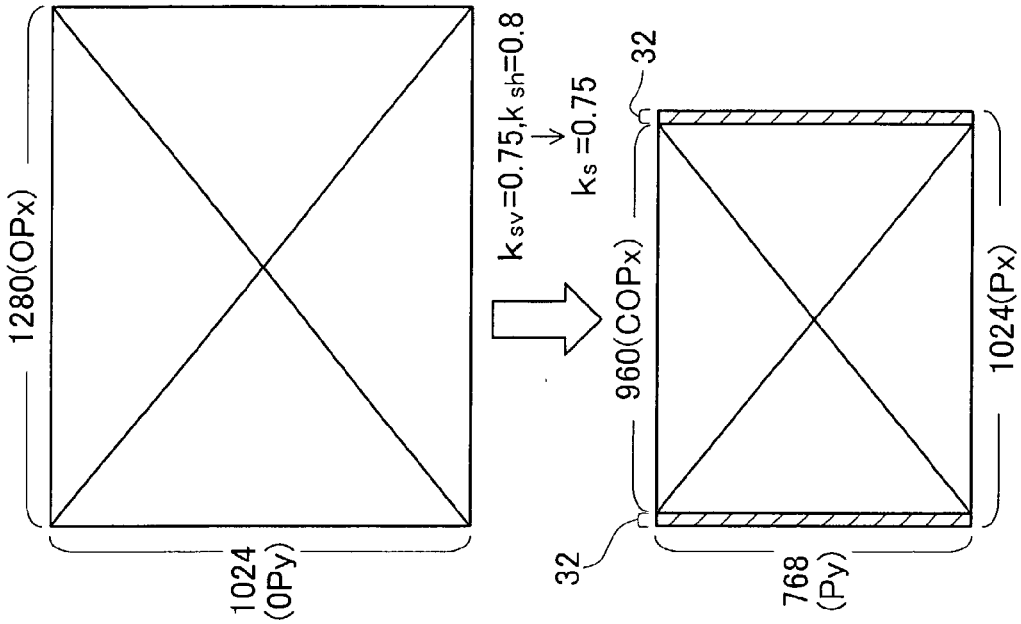
FIG. 3 shows conversion of the resolution carried out by a resolution conversion circuit 40.

In an example shown in FIG. 3(A), the liquid crystal panel 70 has a number of horizontal pixels Px equal to 1024 and a number of vertical pixels Py equal to 768. The image expressed by the input image signal, on the other hand, has a number of horizontal pixels OPx equal to 640 and a number of vertical pixels OPy equal to 480. In this example, a magnification ksh (=Px/OPx) in the horizontal direction and a magnification ksv (=Py/OPy) in the vertical direction are both equal to 1.6. Since both the magnification ksh in the horizontal direction and the magnification ksv in the vertical direction are equal to 1.6, a resolution conversion magnification ks is set equal to 1.6. The resolution conversion circuit 40 expands the image expressed by the input image signal by the preset resolution conversion magnification ks and thereby generates an image signal representing an image of a specific size equal to the size (Px×Py) of the image display area on the liquid crystal panel 70.

In another example shown in FIG. 3(B), the liquid crystal panel 70 has the number of horizontal pixels Px equal to 1024 and the number of vertical pixels Py equal to 768. The image expressed by the input image signal, on the other hand, has the number of horizontal pixels OPx equal to 1280 and the number of vertical pixels OPy equal to 1024. In this example, the aspect ratio (the ratio of the number of horizontal pixels OPx to the number of vertical pixels OPy) of the image expressed by the input image signal is different from the aspect ratio (the ratio of the number of horizontal pixels Px to the number of vertical pixels Py) of the image display area on the liquid crystal panel 70. The magnification ks in the horizontal direction is 0.8, and the magnification ksv in the vertical direction is 0.75. In this case, the smaller magnification ksv in the vertical direction is set to the resolution conversion magnification ks. The resolution conversion circuit 40 contracts the image expressed by the input image signal by the preset resolution conversion magnification ks and thereby generates an image signal representing an image of a specific size substantially equal to the size (Px×Py) of the image display area on the liquid crystal panel 70. A number of horizontal pixels COPx of the contracted image is 960 pixels, which is less than the number of horizontal pixels Px=1280 of the liquid crystal panel 70 by 64 pixels. Left and right ends of each horizontal line are equally interpolated with black image data of 32 pixels.

Contraction of the image is readily attained by any of diverse contraction processes, for example, a simple sampling process that maps multiple pixels of the original image to one representative pixel of the contracted image, a combined process of smoothing and simple sampling, or an averaging process that specifies the mean density of multiple pixels in the original image as a density value of one pixel in the contracted image. Expansion of the image is readily attained by any of diverse interpolation processes, for example, linear interpolation or weighted mean interpolation.

The resolution conversion control module 102 can readily determine the resolution of the image expressed by the input image signal by specifying the input terminal that receives the input image signal or by specifying the type of the synchronizing signal, for example, the signal polarity or the signal frequency. The resolution conversion control module 102 selects the conversion magnification corresponding to the predetermined resolution, and sets the selected conversion magnification in the resolution conversion circuit 40 for conversion of the resolution.

C. Adjustment of Projection Size

Figure 4A:
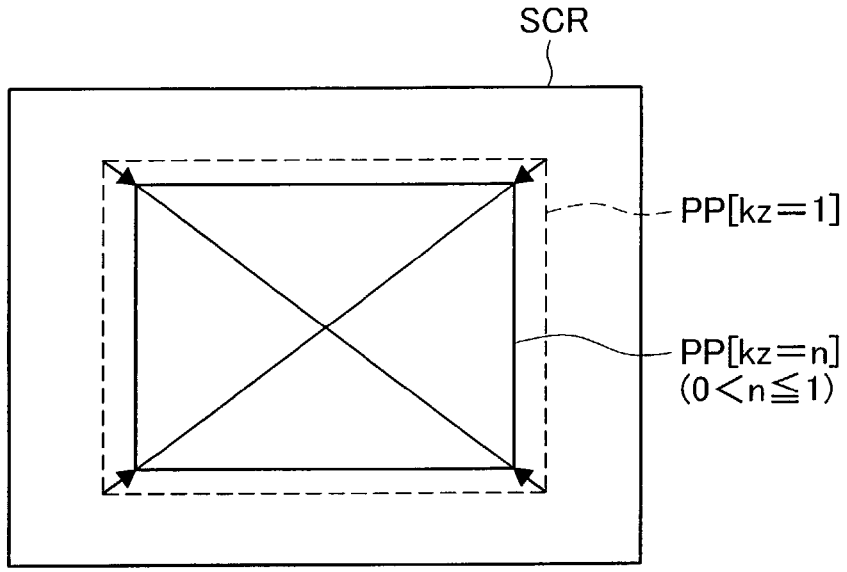
FIG. 4 shows adjustment of the projection size carried out by a projection size adjustment circuit 50.

FIG. 4 shows adjustment of the projection size carried out by the projection size adjustment circuit 50. FIG. 4(A) shows projected images on the screen SCR. The rectangle shown by the broken line represents the size of a maximum projected image PP[kz=1], which is displayed in the setting of the maximum projection size. The rectangle shown by the solid line, on the other hand, represents the size of a contracted projected image PP[kz=n], which is contracted from the maximum projected image PP[kz=1]. A projection factor kz of the maximum projected image PP[kz=1] is equal to 1, and the projection factor kz of the contracted projected image PP[kz=n] is equal to n (0<n<1). The projection factor kz represents the ratio of the size of the actual projected image to the size of the maximum projected image PP[kz=1], that is, the magnification of projection (area ratio).

The projection factor kz is set in response to the user's press of the switch SW1 (see FIG. 1) of the projector PJ or the switch SW2 (see FIG. 1) of the remote control RC. The projection factor kz may be set in a range of 1 to 0.84 by a unit of 0.05. The setting of the projection factor kz is supplied as the size adjustment signal SAS from the projection size adjustment signal generation circuit 110 to the projection size control module 104. The projection size control module 104 controls the operations of the projection size adjustment circuit 50 based on the projection factor kz.

In the case of displaying the maximum projected image PP[kz=1], the projection size adjustment circuit 50 outputs the image data supplied from the resolution conversion circuit 40 without any specific processing. The whole image display area of the liquid crystal panel 70 is actuated according to the image data of the input image signal to display a resulting image.

Figure 4B:
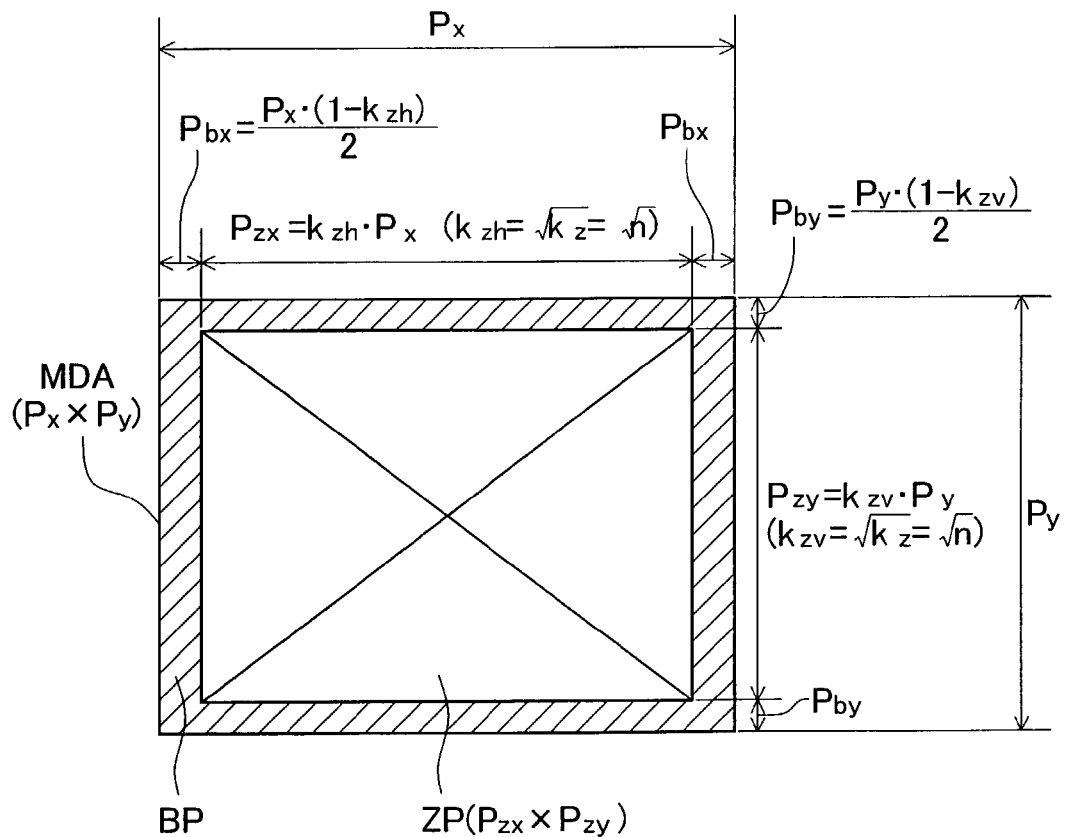

The discussion below regards the case of displaying the contracted projected image PP[kz=n]. FIG. 4(B) shows image data supplied to the image display area MDA on the liquid crystal panel 70 in the case of displaying the contracted projected image PP[kz=n]. In this case, as shown in FIG. 4(B), the projection size control module 104 specifies an image area ZP for displaying a resulting image and a mask display area BP surrounding the image area ZP in the image display area MDA on the liquid crystal panel 70, based on the projection factor kz. The following describes a concrete procedure of specifying these areas ZP and BP.

The procedure first calculates a contraction factor kzh in the horizontal direction and a contraction factor kzv in the vertical direction from the projection factor kz=n. The contraction factor kzh in the horizontal direction and the contraction factor kzv in the vertical direction are set equal to the square root $\sqrt{n}$ of the projection factor kz.

The procedure then multiples the number of horizontal pixels Px and the number of vertical pixels Py of the liquid crystal panel by the preset contraction coefficients kzh and kzv, so as to calculate a number of horizontal pixels Pzx (=kzh·Px) and a number of vertical pixels Pzy (=kzv·Py) in the image area ZP.

The procedure also determines a number of horizontal pixels Pbx (=Px·(1−kzh)/2) in the mask display area BP, that is, on left and right ends of the image display area MDA and a number of vertical pixels Pby (=Py·(1−kzv)/2) in the mask display area BP, that is, on upper and lower ends of the image display area MDA. Here the mask display area BP has the identical setting of the upper and lower widths as well as the identical setting of the left and right widths.

The numbers of pixels in the horizontal direction and in the vertical direction in the image area ZP and in the mask display area BP thus determined are set in the projection size adjustment circuit 50. The projection size adjustment circuit 50 outputs black image data to the respective pixels of the liquid crystal panel 70 corresponding to the mask display area BP. The projection size adjustment circuit 50 contracts the image, which is expressed by the image data supplied from the resolution conversion circuit 40, based on the contraction factors kzh and kzv and outputs the image data of the contracted image to the respective pixels of the liquid crystal panel 70 corresponding to the image area ZP.

The liquid crystal panel 70 is actuated according to the image data of the mask display area BP and the image area ZP output from the projection size adjustment circuit 50 to display an image.

The projected image includes a black image part corresponding to the mask display area BP, so that only an image part corresponding to the image area ZP is actually displayed. The image part corresponding to the image area ZP is a contracted image based on the contraction factors kzh and kzv, that is, the projection factor kz. Although the resolution of the actually displayed image is lowered with a variation in projection factor kz, the projection size of the image is variable with the projection factor kz.

The contraction technique executed in the resolution conversion circuit 40 is applicable for contraction of the image based on the contraction factors kzh and kzv, which is executed to make the projected image fit the image area ZP.

As described above, the projector PJ of the embodiment is capable of readily adjusting the projection size by regulating the image area ZP for displaying the image expressed by the input image data and the mask display area BP surrounding the image area ZP for displaying the black image in the image display area MDA of the liquid crystal panel 70 according to the setting of the projection factor kz.

D. Modifications

The present invention is not restricted to the above embodiment or its application, but there may be many modifications, changes, and alterations without departing from the scope or spirit of the main characteristics of the present invention. All changes within the meaning and range of equivalency of the claims are therefore intended to be embraced therein. Some examples of possible modification are given below.

Figure 5:
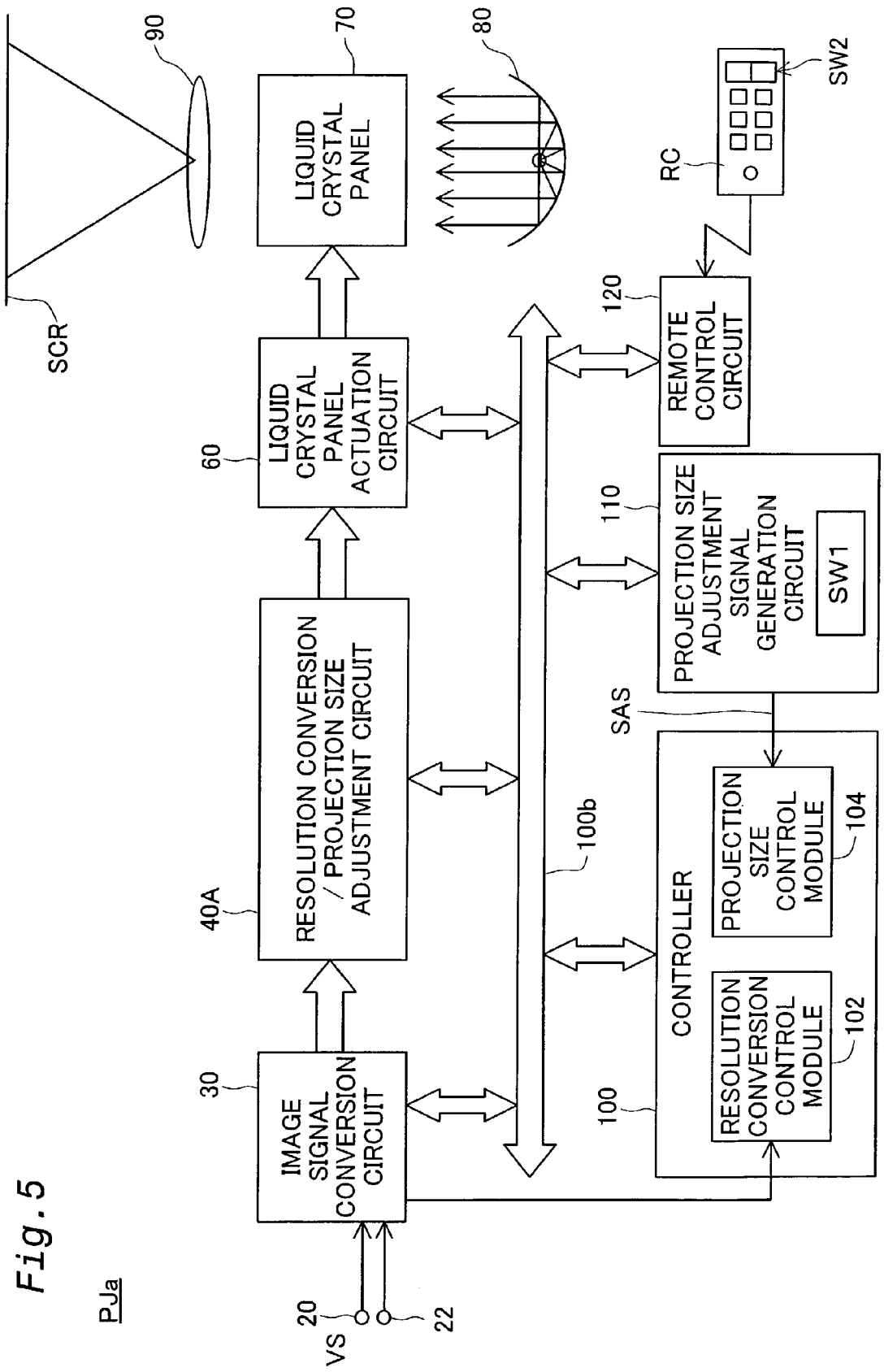
FIG. 5 is a block diagram illustrating a modified structure of the projector PJ.

(1) FIG. 5 is a block diagram illustrating a modified structure of the projector PJ. A projector PJa of this modified example has a resolution conversion/projection size adjustment circuit 40A, which replaces the resolution conversion circuit 40 and the projection size adjustment circuit 50 shown in FIG. 2 and exerts the functions of these two elements. The resolution conversion/projection size adjustment circuit 40A uses either of factors (ks·kzh) and (ks·kzv), which are products of the contraction factors kzh and kzv in the projection size adjustment circuit 50 and the resolution conversion magnification ks in the resolution conversion circuit 40, to expand or contract the image expressed by the input image signal all at once and generate image data of the resulting image corresponding to the image area ZP.

Like the projector PJ of the embodiment, the projector PJa of the modified example is capable of readily adjusting the projection size by regulating the image area ZP for displaying the image expressed by the input image data and the mask display area BP surrounding the image area ZP for displaying the black image in the image display area MDA of the liquid crystal panel 70 according to the setting of the projection factor kz.

(2) In the embodiment and its modified example discussed above, when the input image signal represents an image having a different resolution from the resolution of the image display area on the liquid crystal panel 70, the image expressed by the input image signal is expanded or contracted with the resolution conversion magnification ks. The subsequent projection size adjustment process contracts the image expressed by the resolution converted image signal to make the resolution converted image fit the size of the image area set according to the projection factor kz. One modified procedure may set the resolution conversion magnification ks equal to 1 and directly perform expansion or contraction of the projection size with the projection factor kz without conversion of the resolution. In this procedure, the image expressed by the input image data is expanded or contracted with the contraction factor kzh in the horizontal direction and the contraction factor kzv in the vertical direction based on the projection factor kz, so that the size-adjusted resulting image data fits the image area ZP. This arrangement allows the user to select execution or non-execution of the resolution conversion process.

Figure 6A:
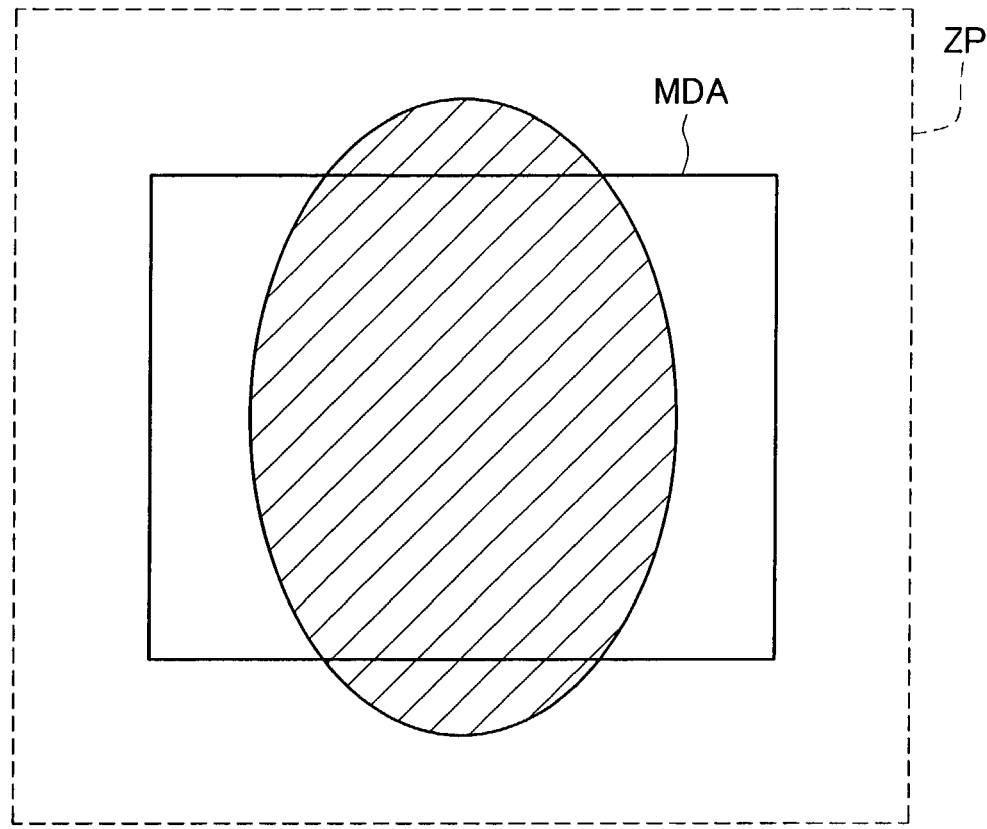
FIG. 6 shows a displayed image when an image area ZP specified by a projection factor kz corresponding to the projection size is greater than a display area MDA of the liquid crystal panel 70.
Figure 6B:
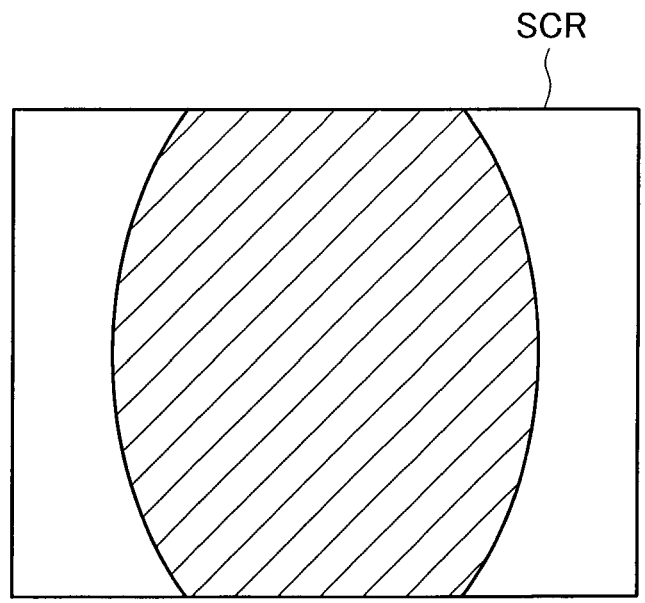

(3) FIG. 6 shows a displayed image when the image area ZP specified by the projection factor kz corresponding to the projection size is greater than the display area MDA of the liquid crystal panel 70. As shown in FIG. 6(A), in the case where the setting of the image area ZP is greater than the image display area MDA on the liquid crystal panel 70, the projection size adjustment circuit 50 generates display image data to cause an image part corresponding to the size of the image display area MDA in the expanded image according to the size of the image area ZP to be displayed in the image display area MDA. Only the expanded image part set in the image display area MDA is accordingly displayed as shown in FIG. 6(B).

When the user's setting of the projection size is relatively small and the image area ZP is less than the image display area MDA on the liquid crystal panel 70, the whole image is contracted or expanded as discussed in the above embodiment. When the user's setting of the projection size is relatively large and the image area ZP is greater than the image display area MDA, on the other hand, only part of the image is expanded and displayed. Regardless of the size of the liquid crystal panel 70, this arrangement ensures projection and display of part or all of the image expanded or contracted according to a desired projection size.

(4) In the embodiment and its modified example discussed above, the black image is applied for the image corresponding to the mask display area BP. The black image is, however, not restrictive in any sense. The image corresponding to the mask display area BP may be an image of any specific color other than black, for example, a white image or an image of the same color as that of the screen SCR.

INDUSTRIAL APPLICABILITY

The projector of the present invention is effectively used to display images at presentations and to show motion pictures and guidance on board or in public spaces.

What is claimed is:

1. A projector that is capable of electronically adjusting a projection size of an image, said projector comprising:
    an image display device that creates an image in response to a display image signal supplied thereto;
    an image signal processing module that generates the display image signal, which is to be supplied to said image display device, from an input image signal supplied from an image supply device; and
    a projection module that projects the image created by said image display device,
    wherein said image processing module adjustably sets an image area on a center of an image display area of said image display device for displaying an image expressed by the input image signal and a mask display area surrounding the image area for displaying an image of a specific color, based on a user's setting of a parameter representing a projection size, said image processing module contracting or expanding the image expressed by the input image signal by a projection factor that can be continuously set to make a size of the image expressed by the input image signal fit a size of the image area in the process of generating the display image signal from the input image signal, while generating the display image signal to make the image of the specific color displayed in the mask display area,
    wherein said image processing module, when the size of the image expressed by the input image signal is different from a size of the image display area, expands or contracts the image expressed by the input image signal to make the size of the image expressed by the input image signal fit the size of the image display area to generate a resolution converted image signal, said image processing module subsequently contracting an image expressed by the resolution converted image signal to make a size of the image expressed by the resolution converted image signal fit the size of the image area.

2. A projector that is capable of electronically adjusting a projection size of an image, said projector comprising:
    an image display device that creates an image in response to a display image signal supplied thereto;
    an image signal processing module that generates the display image signal, which is to be supplied to said image display device, from an input image signal supplied from an image supply device; and
    a projection module that projects the image created by said image display device,
    wherein said image processing module adjustably sets an image area on a center of an image display area of said image display device for displaying an image expressed by the input image signal and a mask display area surrounding the image area for displaying an image of a specific color, based on a user's setting of a parameter representing a projection size, said image processing module contracting or expanding the image expressed by the input image signal by a projection factor that can be continuously set to make a size of the image expressed by the input image signal fit a size of the image area in the process of generating the display image signal from the input image signal, while generating the display image signal to make the image of the specific color displayed in the mask display area,
    wherein said image processing module, in the case where the size of the image area set based on the parameter is greater than a size of the image display area, generates the display image signal to cause an image part, which corresponds to the size of the image display area in an expanded image according to the size of the image area, to be displayed in the image display area.

3. A projector in accordance with claim 1, wherein the image of the specific color is a black image.

4. A projector in accordance with claim 2, wherein the image of the specific color is a black image.

* * * * *